(12) United States Patent
Zhao et al.

(10) Patent No.: US 12,530,078 B2
(45) Date of Patent: Jan. 20, 2026

(54) GAZE AWARE READING ASSISTANCE SYSTEM

(71) Applicant: Wisconsin Alumni Research Foundation, Madison, WI (US)

(72) Inventors: Yuhang Zhao, Waunakee, WI (US); Ru Wang, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 18/753,069

(22) Filed: Jun. 25, 2024

(65) Prior Publication Data

US 2025/0390169 A1    Dec. 25, 2025

(51) Int. Cl.
*G06F 3/01*      (2006.01)
*G10L 13/02*      (2013.01)

(52) U.S. Cl.
CPC .............. *G06F 3/013* (2013.01); *G10L 13/02* (2013.01)

(58) Field of Classification Search
CPC ...... G06F 3/013; G06F 3/0485; G06F 3/0482; G06F 18/21; G06F 3/04842; G06F 40/30; G06F 3/017; G06F 3/167; G06F 3/04886; G06F 3/0237
See application file for complete search history.

(56) References Cited

U.S. PATENT DOCUMENTS

| | | | |
|---|---|---|---|
| 9,606,622 B1 * | 3/2017 | Brothers | G06F 3/013 |
| 2015/0000026 A1 * | 1/2015 | Clements | G06F 3/04886 4/443 |
| 2016/0224308 A1 * | 8/2016 | Pierce | G06F 3/165 |

FOREIGN PATENT DOCUMENTS

| | | | | |
|---|---|---|---|---|
| CN | 108471486 A | * | 8/2018 | G06F 3/013 |
| CN | 115398377 A | * | 11/2022 | G06F 3/0482 |
| CN | 116700563 A | * | 9/2023 | G06F 3/0483 |

OTHER PUBLICATIONS

Ru Wang et al.; "Understanding how low vision people read using eye tracking." In Proceedings of the 2023 CHI Conference on Human Factors in Computing Systems, pp. 1-17. 2023. US.

* cited by examiner

*Primary Examiner* — Matthew A Eason
*Assistant Examiner* — Scott D Au
(74) *Attorney, Agent, or Firm* — Boyle Fredrickson, SC

(57) ABSTRACT

A reader assistance device employs eye tracking to infer an individual's reading progress which is then used to provide visual aids by highlighting words as they have been read and the next line of words as well as to provide additional magnification or spoken versions of words that are difficult to comprehend reflected by the inferred reading progress. The inferred reading progress may also indicate skimming behavior to trigger a summarizer for the skimmed section.

7 Claims, 3 Drawing Sheets

GAZE AWARE READING ASSISTANCE SYSTEM

STATEMENT REGARDING FEDERALLY SPONSORED RESEARCH OR DEVELOPMENT

--

CROSS REFERENCE TO RELATED APPLICATION

--

Background of the Invention

The present invention relates generally to assistive technology for low vision people and, in particular, to a system that employs eye tracking to provide reading assistance.

Reading is a common challenge for low vision people. Low vision is a visual impairment that cannot be corrected by eyeglasses, contact lenses, and other standard treatments. There are different low vision conditions, such as central vision loss, peripheral vision loss, night blindness, and blurry vision. Different conditions can affect low vision people's reading ability and behaviors in different ways; for example, words may appear distorted to people with central vision loss, and people with severe peripheral vision loss may only see one or two words at a time without being able to scan ahead.

To leverage their reduced vision, low vision people use different magnification methods for reading, such as increasing font size or using screen magnifiers. Although screen magnifiers can address the low acuity difficulty to some extent, some usability issues have been reported repeatedly by prior research including loss of context because the reader can only view a partial area of the screen at a time. In addition, moving the mouse around to magnify different areas on the screen demands high spatial visualization skills, increasing users' cognitive load during reading.

With the limitations of screen magnifiers, low vision people's reading experience is largely diminished. Prior research shows that they read text boxes 3.2 times slower than sighted people.

SUMMARY OF THE INVENTION

The present invention provides assistive technology for people with low vision by using eye tracking to deduce reading progress. This reading progress information can be used to identify difficult to comprehend words and to increase magnification at those times, or to highlight the next text line, or to mark the reader's place when they are diverted to a second task and must then return to reading. In some embodiments, the reading progress information may be used to identify skimming behavior to invoke automatic summarizing of the text material.

More specifically, in one embodiment, the invention provides a reading assistance device for individuals with low vision and having an electronic display receiving text data to display text words, an eye tracker outputting gaze direction signals indicating a gaze direction of a human observer viewing the electronic display, and an electronic circuit communicating with the display and eye tracker and operating to: (a) output text data to the electronic display for the display text words in lines; (b) receive the gaze direction signals of the human observer viewing the text words; (c) map the gaze directions signals to words of the text words to determine a reading progress of the human observer; and (d) modify the display of lines of text words according to the determined reading progress.

It is thus a feature of at least one embodiment of the invention to provide intelligent augmentation of text for low vision readers at times inferred from reading progress extracted from eye tracking information.

In one embodiment, the reading progress may provide a word dwell time measure indicating a difficult to comprehend word, and the screen magnification of the difficult to comprehend word may be increased for dwell times in excess of a predetermined dwell time.

It is thus a feature of at least one embodiment of the invention to use reading progress information to infer that the reader is having trouble in comprehending a word, and to selectively provide augmentation. Such opportunistic magnification provides an improved trade-off between magnification and context loss.

The device may further include a text-to-speech generator to provide a spoken rendition of the difficult to comprehend word.

It is thus a feature of at least one embodiment of the invention to permit sparing use of text-to-speech assistance avoiding the distraction and delay associated with continuous text-to-speech translation.

The reading progress information may identify a current line of text words being read in order to highlight at least a beginning of a next line of text words in a reading order of lines of text words.

It is thus a feature of at least one embodiment of the invention to assist the user in identifying and moving to the next line of text which can be particularly difficult with magnified text where a full line width is not visible.

The reading progress information may provide a current word focus identifying a current word being read by the human observer to highlight that current word.

It is thus a feature of at least one embodiment of the invention to assist the reader in resuming reading, for example, after a change of magnification window location or momentary shifting of attention to another task.

The highlighting may be persistent for a predetermined time greater than one-half second after the current word focus changes.

It is thus a feature of at least one embodiment of the invention to provide a continuous multiword reference point for the reader as the reader reads providing both time domain and spatial information.

The text words in lines may be contained within a text box and the predetermined time may be extended for times when the gaze direction indicates a gaze of the human observer is outside of the text box.

It is thus a feature of at least one embodiment of the invention to provide a persistent place marker when the user is diverted to a task outside of the current text window.

The reading progress information may indicate a skimming of the text words in lines by the reader and may augment the display of lines of text words, for example, by replacing them with a summary of the lines of text words according to that indication or providing a spoken version of the summary via a text-to-speech generator.

It is thus a feature of at least one embodiment of the invention to use the reading progress information to infer a desire for a summary of text to seamlessly provide the same.

The program may further operate to calibrate the eye tracking system by: (e) outputting a graphic pattern to the electronic display for the display of gaze targets; (f) generating a mapping between gaze directions and gaze targets on the display screen; (g) identifying discontinuities in the mapping to produce individually contiguous sub maps representing different preferred retinal loci of the reader; and (h) switch between sub maps in mapping the gaze direction to text words.

It is thus a feature of at least one embodiment of the invention to accommodate low vision individuals with central vision loss who may employ multiple preferred retinal loci (PRLs) such as can confound standard eye tracking.

The selection of the sub maps may switch between sub maps according to predefined regions of gaze direction.

It is thus a feature of at least one embodiment of the invention to provide a simple method for resolving ambiguity between multiple sub maps caused by multiple PRLs when performing eye tracking.

The gaze direction signals employed by the present invention may be limited to a dominant eye of the human observer.

It is thus a feature of at least one embodiment of the invention to accommodate individuals with low visual abilities having inconsistent gaze behaviors.

These particular objects and advantages may apply to only some embodiments falling within the claims and thus do not define the scope of the invention.

DETAILED DESCRIPTION OF THE PREFERRED EMBODIMENT

Figure 1:
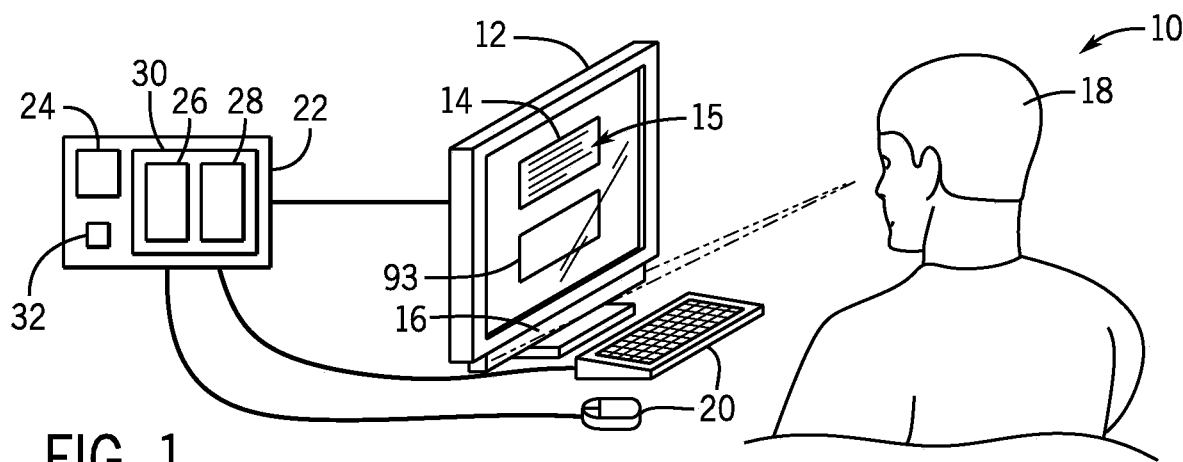
FIG. 1 is a simplified perspective view of a system providing for a graphics display and eye tracking technology communicating with a computer and suitable for use with the present invention.

Referring now to FIG. 1, a hardware platform 10 suitable for use with the present invention may provide for a graphic display screen 12 capable of displaying graphics and text in multiple windows. The windows may be software objects as is generally understood in the art and may, for example, present a text box 14 holding multiple lines 15 of text.

The graphic display screen 12 may be associated with an eye tracking accessory 16, for example, attached to the bottom of the graphic display screen 12 and operating to monitor a gaze direction of a human reader 18 observing the graphic display screen 12. An off-the-shelf eye tracking accessory 16 suitable for use with the present invention is the Tobii Pro Fusion 120 Hz eye tracker commercially available from Tobii of Stockholm, Sweden. Such devices produce a stream of gaze-direction values deduced from images of the eyes of the of the human reader.

The graphic display screen 12 together with other interface devices 20, for example, a keyboard and mouse, may communicate with a computer 22 providing one or more processors 24 executing programs 26 and 28 held in computer memory 30. Programs 26 may be any of a variety of known computer programs having text outputs including browsers, word processing programs, screen readers and the like. The programs 26 may also include the computer operating system, such as the Microsoft Windows operating system, working in conjunction with these other programs to display text outputs in the text boxes 14 arranged in a reading order, typically, in each line from left to right and then from top to bottom among lines. The spatial position of the text and its formatting may be adjusted by the operating system, for example, to change the size of the font, color, intensity, animation effects, and position of text within the text box 14, as well as to allow movement of the text box 14 as a window. As is understood in the art, such operating systems provide an application programmer interface (API) for such text manipulation and for outputting spatial location of the text. The API allows communication with other programs including a program 28 that provides for reading assistance per the present invention as will be discussed below.

The computer 22 may also include a sound circuit 32, often called a sound card, providing for the generation of sound, for example, usable to produce spoken language using a text-to-speech program typically incorporated into the operating system and again accessible through API calls.

Figure 2:
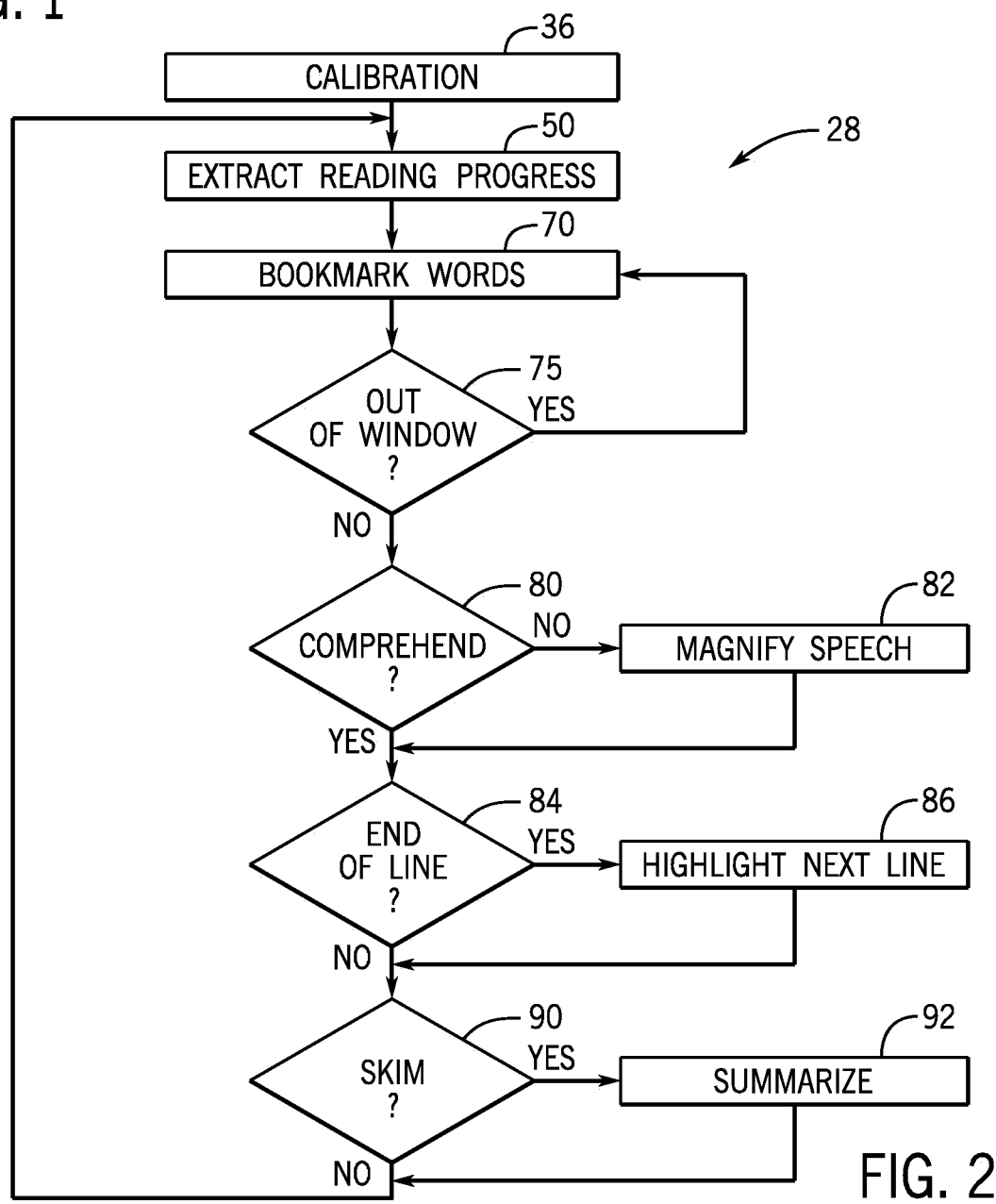
FIG. 2 is a flowchart of a program executed on the computer system of FIG. 1 in implementing the present invention.
Figure 3:
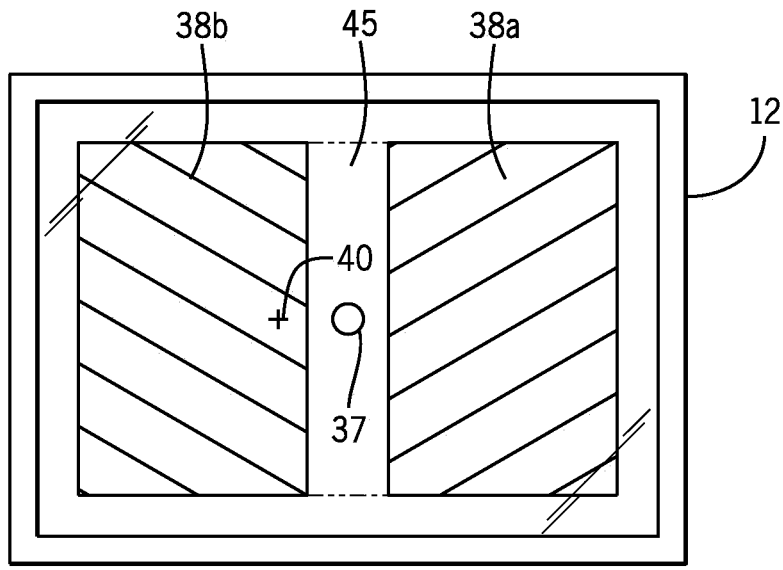
FIG. 3 is a diagrammatic elevational depiction the display screen superimposed with gaze direction fields representing a mapping process of gaze direction to screen location showing a discontinuity that can be developed in this mapping with central vision loss.

Referring now also to FIGS. 2 and 3, in a first step, the program 28 may provide for a calibration of the eye tracking accessory 16 to map gaze angles determined by the eye tracking accessory 16 to spatial locations on the graphic display screen 12. This calibration process is indicated by process block 36 (FIG. 2) and, as best seen in FIG. 3, operates by displaying on the graphic display screen 12 one or more targets 37. The reader 18 is instructed to fix his or her gaze on a specific target 37 and a corresponding gaze angle is determined from the eye tracking accessory 16 in order to register the specific target 37 to a corresponding gaze point 40 in a gaze direction field 38. In later use, gaze tracking information from the eye tracking accessory 16 will be applied to the gaze direction field 38 and the map used to determine a specific location on the graphic display screen 12. The targets 37 may be made larger than usual and/or with greater spacing and fewer targets to assist individuals with low vision. The size of the target could be determined based on individuals' visual abilities, for example, visual acuity.

Figure 4:
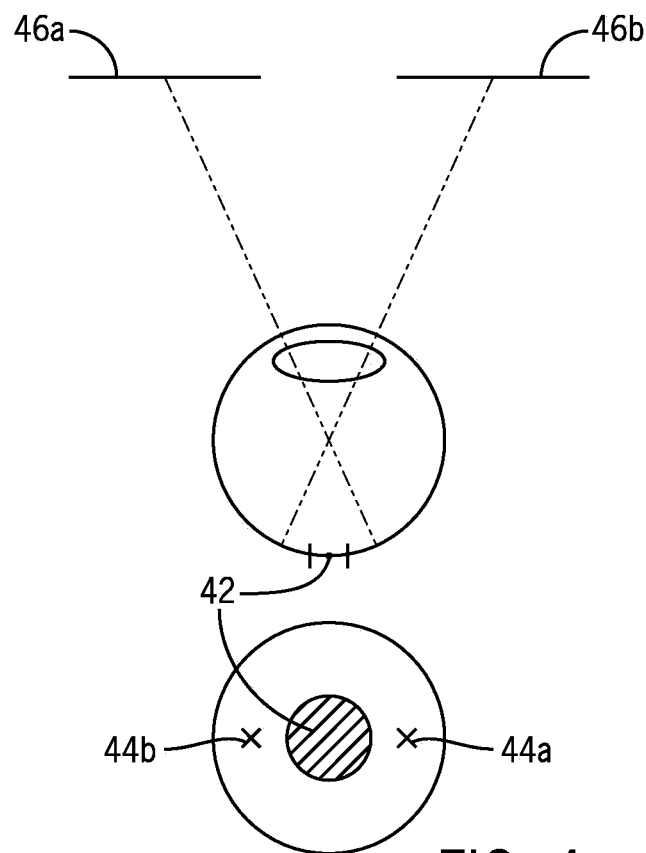
FIG. 4 is a top plan cross-section of a human eye observing left and right sides of the screen and aligned with a separate elevational view of the retina showing central vision loss such as produces the discontinuity of FIG. 3.

Generally, this mapping between the graphic display screen 12 and the gaze direction field 38 would be expected to be largely contiguous in the gaze direction field 38; however, for low vision readers 18 with central vision loss this may not be the case. Referring momentarily to FIG. 4, for individuals with central vision loss, a central portion 42 of the retina (fovea) may no longer function, for example, because of macular degeneration. In such cases, the reader 18 may adopt an eccentric retinal location as a substitute for the fovea. For example, the reader 18 may adopt either a left or a right preferred retinal locus (PRL) 44a or 44b, respectively, depending on the relative position of a viewing field of interest 46a or 46b, being the left and right side of the graphic display screen 12 in this example. The shift between PRLs creates an anomalous region 45 in the mapping represented as a gap that divides the gaze direction field 38 into two subfields 38*a* and 38*b* where the gaze directions transiting between subfields are not continuous, indicating there are two possible mappings associated with the adoption of PRL 44*a* or 44*b*, respectively.

This anomalous region 45 may be used to define two distinct subset gaze direction fields 38*a* and 38*b* which may be used alternatively for subsequent eye tracking. In a simple case, the particular subset gaze direction field 38 is used to map gaze direction information to position on the graphic display screen 12, and the subset gaze direction field 38 may be selected based on the location of the anomalous region 45. The anomalous region 45 may be determined by rendering an array of targets on the graphic display screen 12 in a random order and having the reader 18 to fixate on each target to collect reader's gaze direction indicated by the eye track accessory 16. The anomalous region 45 will be between the adjacent targets where the reader's gaze direction transition demonstrates discontinuity. Other techniques such as the detection of rapid eye movements (suggesting a change of PRL) of a given angle, speed, and direction may also be employed to make this selection as determined empirically. The number of subset gaze directions can be extended to a larger number using these approaches as necessary.

Figure 5:
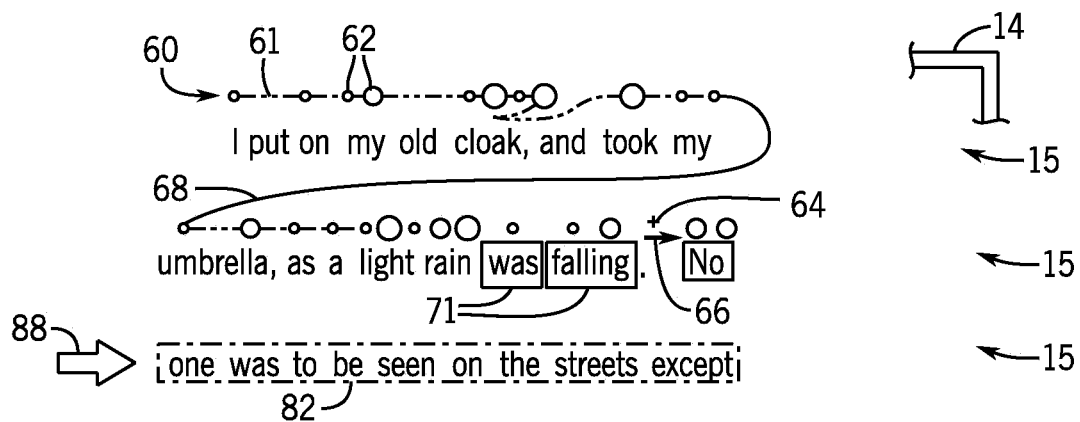
FIG. 5 is an example display of text on the display of FIG. 1 superimposed with symbols representing extracted reading progress information and showing various forms of highlighting in one embodiment.
Figure 6:
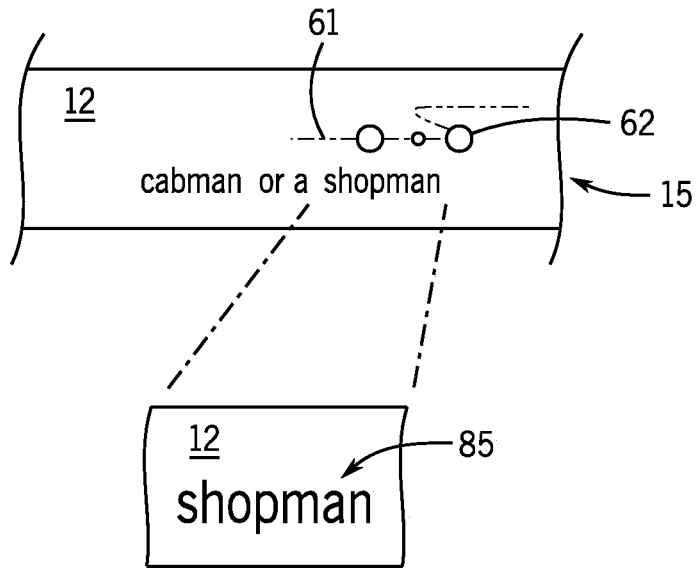
FIG. 6 is a fragmentary view of the text of FIG. 5 showing a magnification adjustment upon detection of a difficult to comprehend word.

Referring still to FIG. 2, after calibration, at process block 50, the gaze direction of the reader 18 is mapped to a position on the graphic display screen 12 and this position is mapped to words within multiple lines of text, for example, as shown in FIG. 5. This latter mapping is performed by API calls which allow the spatial position of the text to be determined such as may be influenced by the text being in a movable window, subject to different word wrapping, font size, and the like. This latter information is then used to establish an inferred reading progress data 60 with respect to the displayed text. Generally, the inferred reading progress data 60 provides both information about the path of the eyes of the reader 18 and a reading path 61 represented by a dotted line in FIG. 5 and dwell times 62 along that path, where the gaze remains in a certain text area for a period of time, indicated diagrammatically by circles in FIG. 5 whose size indicates dwell time.

The reading path 61 will generally progress from left to right across each line of text and then downward from line to line; however, there can be significant retrograde motion and other deviations from this path. Accordingly, the inferred reading progress data 60 will desirably use a statistical analysis of raw gaze position data on the graphic display screen 12, for example, averaging gaze positions and/or fitting gaze position to an expected reading path of left to right and top to bottom. In one embodiment, the inferred reading progress data 60 may also provide a statistical gaze position 64 showing a location of reading by averaging the positions of gaze points that remain in a display area within certain size threshold for a period of time and may establish a directional vector 66 that connects the current and the next location of reading indicating an average velocity (speed and direction) of eye movement.

The data of the inferred reading progress data 60 allows a number of analyses to be conducted and may be used to distinguish between a reading trajectory along each line of text and fast retrograde motion 68 when moving to a next line in the text.

The inferred reading progress data 60 may employ averaging or the like to further establish a reading progress statistical gaze position 64 showing a general trend of reading progress removed from high-frequency eye movements and may establish a general directional vector 66 indicating a velocity (speed and direction) of eye movement. This allows a number of analyses to be conducted and, for example, to distinguish between the reading path 61 and fast retrograde motion 68 when moving to a next line in the text. This data may in turn be processed to identify where the reader 18 is with respect to the end of a line, words where the reader 18 is lingering possibly because of lack of comprehension, and situations where the reader 18 is skimming as will be discussed below. Note that generally the inferred reading progress data 60 is not visible to the user but provided to illustrate the fundamental data extraction.

Referring again to FIG. 2, after extraction of the inferred reading progress data 60, at process block 70 the statistical gaze position 64, for example, may be used to apply highlights 71 to words of the text as the statistical gaze position 64 traverses those words, indicating that they are being read or were recently read. The highlights 71, and similar highlighting to be discussed below, may take a number of different forms including changing a font intensity, underlining, bolding, animation, or the like or the insertion of additional symbols that indicate particular words in emphasis, for example, boxes or arrows around the words. These highlights 71, may be persistent, for example, lingering after the statistical gaze position 64 has passed the highlighted word for one-half to ten seconds. In some embodiments, the highlighting may decrease, for example, fading in intensity as time progresses.

This highlighting serves to provide an anchor point for the reader despite movements of the text, for example, within a changing or shifting magnification window or when the user redirects his or her attention to another portion of the screen, for example, outside of the text box 14 holding the text lines. In this latter case, the excursion of the gaze outside of the text box 14 may be detected as indicated by decision block 75 through an API defining the boundaries of the text box as it may be moved within a window about the graphic display screen 12. When the statistical gaze position 64 is directed outside of the text box 14, the highlighting 71 is frozen (e.g., erasure of the highlighting or fading of the highlighting suspended) so that the highlighting may serve again as a reference point when the reader 18 returns to viewing the text no matter how delayed that return may be.

Referring still to FIG. 2 and to FIG. 5, as indicated by decision block 80, the dwell time 62 may also be analyzed as associated with a given word, and a dwell time 62 that exceeds a predetermined threshold may be used to infer that the reader 18 is having difficulty in reading that particular associated word. Detection of this difficulty may cause the program 28 to execute process block 82 operating to assist the user in making sense of the difficult to understand word, for example, by increasing the magnification of that word to provide a magnified version 85 and/or providing a spoken rendition of that word using the text-to-speech capabilities of the operating system.

Referring still to FIG. 2, at process block 84, when the statistical gaze position 64 approaches an end of a line or other predetermined point on a line of words, the program 28 may proceed to process block 86 and highlight the next line 88, to aid the reader 18 to continue reading despite the length of the retrograde motion 68 and the possibility that this motion requires a change in the magnification window location. This highlighting may remain in place until the statistical gaze position 64 reaches the beginning of that line and can remain longer until the statistical gaze position 64 reaches the end of that line. As indicated, the highlighting may either highlight the line text, for example, by changing its format or the like, or may provide for an arrow 88 marking the beginning of the line for similar effect.

Referring still to FIG. 2, at succeeding decision block 90, the inferred reading progress data 60 maybe analyzed to see if the reader 18 may be skimming the text such as would be represented by a trajectory 61 which does not complete lines or move at an empirically determined speed and pattern associated with normal reading. This detected behavior may trigger process block 92 which identifies a predetermined section of the text being skimmed to augment that text with a summary 93 (shown in FIG. 1), for example, generated by a conventional summarizer or artificial intelligence summarizing program known in the art.

This summary 93 may then be processed during reading in the same way as discussed above including the processing of process boxes 70-86.

Generally it will be noted that extraction of the inferred reading progress data 60 may make use of the known and expected pattern of reading from left to right and top to bottom and fit the gaze data to this pattern for reduced susceptibility against high-frequency eye movements, distractions, or the like. Spatial slew rate or bandpass filters may also be employed as well as models including those using machine learning to discern the underlying experience of the reader 18 through the gaze data. The threshold used in decision block 80 to determine whether a word is difficult to read or not may be informed by a dictionary of empirically determined difficult to read words such as "though" and "through" and the like, with a lower threshold being used for such difficult to understand words.

Additional details of the invention are provided in the Ru Wang, Zach Potter, Yun Ho, Daniel Killough, Linxiu Zeng, Sanbrita Mondal, Yuhang Zhao, "GazePrompt: Enhancing Low Vision People's Reading Experience with Gaze-Aware Augmentations "arXiv: 2402.12772v1 [cs.HC] 20 Feb. 2024, hereby incorporated by reference.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a computer" and "a processor" or "the microprocessor" and "the processor," can be understood to include one or more devices that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network. Generally the term computer should be considered to embrace electronic circuits providing equivalent function, for example, FPGAs and the like It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A reading assistance device for individuals with low vision comprising:
   an electronic display receiving text data to display text words;
   an eye tracker outputting gaze direction signals indicating a gaze direction of a human observer viewing the electronic display; and
   an electronic circuit communicating with the electronic display and eye tracker and operating according to a stored program to:
   (a) output text data to the electronic display for the display of text words in lines;
   (b) receive the gaze direction signals of the human observer viewing the text words;
   (c) map the gaze directions signals to words of the text words to determine a reading progress of the human observer; and
   (d) modify the display of lines of text words according to the determined reading progress; and
   wherein the reading progress includes a current word focus identifying a current word being read by the human observer to highlight that word;
   wherein the highlight is persistent for a predetermined time greater than one-half second after the current word focus changes; and
   wherein the text words in lines are contained within a text box and wherein the predetermined time is extended for times when the gaze direction indicates a gaze of the human observer is outside of the text box.

2. A reading assistance device for individuals with low vision comprising:
   an electronic display receiving text data to display text words;
   an eye tracker outputting gaze direction signals indicating a gaze direction of a human observer viewing the electronic display; and an electronic circuit communicating with the electronic display and eye tracker and operating according to a stored program to:
(a) output text data to the electronic display for the display of text words in lines;
(b) receive the gaze direction signals of the human observer viewing the text words;
(c) map the gaze directions signals to words of the text words to determine a reading progress of the human observer;
(d) modify the display of lines of text words according to the determined reading progress; and
wherein the reading progress indicates a skimming of the text words in lines by the human observer and wherein step (d) augments the display of lines of text words by replacing them with a summary of the lines of text words or providing a spoken version of the summary using the text-to-speech generator.

3. A reading assistance device for individuals with low vision comprising:
an electronic display receiving text data to display text words;
an eye tracker outputting gaze direction signals indicating a gaze direction of a human observer viewing the electronic display; and
an electronic circuit communicating with the electronic display and eye tracker and operating according to a stored program to:
(a) output text data to the electronic display for the display of text words in lines;
(b) receive the gaze direction signals of the human observer viewing the text words;
(c) map the gaze directions signals to words of the text words to determine a reading progress of the human observer;
(d) modify the display of lines of text words according to the determined reading progress; and
wherein the electronic circuit operating according to the stored program further:
(e) outputs a graphic pattern to the electronic display for the display of gaze targets;
(f) generates a mapping between gaze directions and gaze targets;
(g) identifies discontinuities in the mapping to produce individually contiguous sub maps representing different preferred retinal loci of the human observer; and
(h) switch between sub maps in mapping the gaze direction to text words.

4. The reading assistance device of claim 3 wherein (h) switches between sub maps according to predefined regions of gaze direction.

5. A method of assisting an individual with low vision employing:
an electronic display receiving text data to display text words;
an eye tracker outputting gaze direction signals indicating a gaze direction of a human observer viewing the electronic display; and
an electronic circuit communicating with the electronic display and eye tracker, the method comprising:
(a) outputting text data to the electronic display for the display text words in lines;
(b) receiving the gaze direction signals of the human observer viewing the text words;
(c) mapping the gaze direction signals to words of the text words to determine a reading progress of the human observer; and
(d) modifying the display of lines of text words according to the determined reading progress; and
wherein the reading progress includes a current word focus identifying a current word being read by the human observer to highlight that word;
wherein the highlight is persistent for a predetermined time greater than one-half second after the current word focus changes; and
wherein the text words in lines are contained within a text box and wherein the predetermined time is extended for times when the gaze direction indicates a gaze of the human observer is outside of the text box.

6. A method of assisting an individual with low vision employing:
an electronic display receiving text data to display text words;
an eye tracker outputting gaze direction signals indicating a gaze direction of a human observer viewing the electronic display; and
an electronic circuit communicating with the electronic display and eye tracker, the method comprising:
(a) outputting text data to the electronic display for the display text words in lines;
(b) receiving the gaze direction signals of the human observer viewing the text words;
(c) mapping the gaze direction signals to words of the text words to determine a reading progress of the human observer; and
(d) modify the display of lines of text words according to the determined reading progress; and
wherein the reading progress indicates a skimming of the text words in lines by the human observer and wherein step (d) augments the display of lines of text words by replacing them with a summary of the lines of text words or providing a spoken version of the summary using the text-to-speech generator.

7. A method of assisting an individual with low vision employing:
an electronic display receiving text data to display text words;
an eye tracker outputting gaze direction signals indicating a gaze direction of a human observer viewing the electronic display; and
an electronic circuit communicating with the electronic display and eye tracker, the method comprising:
(a) outputting text data to the electronic display for the display text words in lines;
(b) receiving the gaze direction signals of the human observer viewing the text words;
(c) mapping the gaze direction signals to words of the text words to determine a reading progress of the human observer;
(d) modifying the display of lines of text words according to the determined reading progress; and
further including the steps of:
(e) outputting a graphic pattern to the electronic display for the display of gaze targets;
(f) generating a mapping between gaze directions and gaze targets;
(g) identifying discontinuities in the mapping to produce individually contiguous sub maps representing different preferred retinal loci of the human observer; and
(h) switching between sub maps in mapping the gaze direction to text words.

* * * * *